UNITED STATES PATENT OFFICE.

EDWARD H. HUCH, OF BRAUNSCHWEIG, GERMANY.

IMPROVEMENT IN TREATING BLOOD.

Specification forming part of Letters Patent No. 155,517, dated September 29, 1874; application filed August 5, 1874.

*To all whom it may concern:*

Be it known that I, EDWARD H. HUCH, of Braunschweig, Germany, have invented a new and useful Improvement in Treating Blood, of which the following is a specification:

This invention consists in treating blood with lime, and then drying it; also in mixing blood, after the same has been treated with lime, with bran or flour.

In carrying out my invention, I take a vessel large enough to receive the blood of an ox— that is to say, about fifteen litres or thirty pounds of blood. When this vessel has been filled with blood I introduce therein about fifteen ounces, or nearly one pound, of unslaked lime, reduced to a powdered state either by grinding or otherwise. The blood must be taken fresh, and the lime ought to be reduced to a fine powder, the finer the better for the final result. The powdered lime is stirred into the blood for about three or five minutes, until the blood begins to turn somewhat darker than its original color. Then the mass is left standing for from five to ten minutes, allowing the lime to settle down on the bottom of the vessel. After that the blood congeals and forms a gelatinous mass, when it is cut out of the vessel, reduced to small pieces, and dried.

If desired, the congealed blood, before being dried, may be mixed with bran or flour or some other farinaceous or other substance good for food.

The drying may be accomplished in the sun or open air, or by means of artificial heat, as found most convenient.

The effect of the lime on the blood is to absorb its humidity, and by this means preserve it against putrefaction.

The substance or substances adapted for being mixed with the blood are various, but I prefer to use bran or flour, when the product is to be used for animal food. Of bran or flour I take about one pound to two pounds of blood, which is about fifteen pounds of bran to the blood of an ox. I can use, however, ground oil-cake or any farinaceous substance, and even saw-dust for certain kinds of animals, with a good result.

If the mixture is to be used immediately after being prepared, it need not be dried, but in this case it should be well infused with the bran or flour.

The product of this process is an exceedingly nutritive and wholesome article of food, which, though especially intended for cattle, fowl, &c., is adapted for food even for mankind.

The product when dried will retain its nutritive qualities for an indefinite length of time. If dried it should be broken or ground up when being fed.

The congealed blood, after having been dried, may also be mixed with bone-black and used as a manure.

By my process the blood of animals, as the same are slaughtered, is not only rendered innoxious, but it is converted into a valuable article of commerce.

What I claim as my invention, and desire to secure by Letters Patent, is—

1. The within-described mode of treating blood, the same consisting in mixing with the blood unslaked lime, for the purpose of abstracting moisture, and then solidifying the fibrin and other solid ingredients to form a gelatinous mass, and finally drying the same, substantially in the manner herein specified.

2. A compound, consisting of the fibrin and other solid ingredients of blood and flour or other farinaceous substance, substantially as described.

In testimony that I claim the foregoing I have hereunto set my hand and seal.

Brunswick, July 11, 1874.

E. HEINSON HUCH. [L. S.]

Witnesses:
RUD. LOHNEFINKE,
MAX GUTKIND.